(No Model.)
F. BAIN.
DYNAMO ELECTRIC MACHINE.
No. 337,041. Patented Mar. 2, 1886.
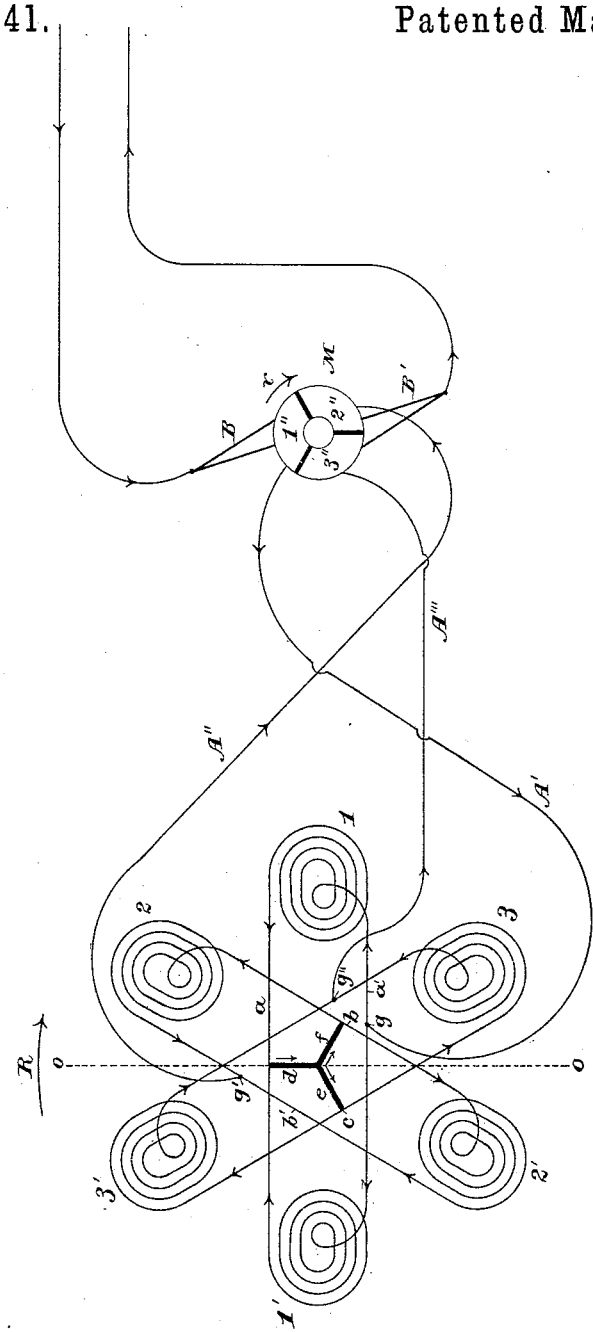
Attest:
Court A. Cooper.
Wm A. Harries
Inventor:
Foni Bain
by
Foster & Thurman
attys

UNITED STATES PATENT OFFICE.

FORÉE BAIN, OF CHICAGO, ILLINOIS.

DYNAMO-ELECTRIC MACHINE.

SPECIFICATION forming part of Letters Patent No. 337,041, dated March 2, 1886.

Application filed September 25, 1885. Serial No. 178,138. (No model.)

*To all whom it may concern:*

Be it known that I, FORÉE BAIN, a citizen of the United States, residing at Chicago, Cook county, Illinois, have invented certain new and useful Improvements in Electric Generators, of which the following is a specification.

My invention relates to armatures for electric generators and motors, and is an improvement upon the machines shown in my Letters Patent granted to me October 30, 1883, Nos. 287,608 and 287,609. In the machine shown in the former case the armature coils, when passing through the neutral line of the field of force and in its immediate vicinity are transferred from the working-circuit into a circuit of comparatively very high resistance, and in the machine shown in the later case the armature-coils are short-circuited. In both cases there is a residue of current generated in the coils passing through the neutral line, owing to the fact that the width of the coils is always large as compared with the width of the theoretical neutral space, and also for the reason that the practical outline of the neutral space is not as regular as would seem to be from theoretical considerations alone. Portions of the coils moving in the "neutral space," so called, will therefore always project either to the right or to the left into the adjoining effective field, and thus some current will always be generated in these coils. The retarding effect of this current, whether it passes through a long or a short circuit, and notably in the latter case, is an element which impairs to a certain extent the efficiency of the machine when the same is used as a generator. If, as in earlier generators, the coils passing through the neutral line or space are cut out by breaking their continuity, destructive sparks at the points of make and break (at the commutator) are the result.

The object of my invention is to produce a dynamo-electric or magneto-electric generator, which may also be operated as an effective electro-magnetic motor, in which the coils passing the neutral line shall be removed from the external circuit without breaking the continuity of their internal circuit and without long or short circuiting the same. I accomplish this result by arranging upon a suitable armature-core (preferably of the ring form) a series of pairs of coils, the members of the pairs being located at diametrically-opposite points of the armature and connected with each other in continuous loops. These loops are tapped for connection with the commutator and external circuit; but when a pair of coils passes through the neutral line the connection of their loop with the commutator is broken. No current whatever is then generated in the disconnected loop, even if it were passing through an effective portion of the field of force, since any tendency to generation of current in one coil is opposed by the tendency of generation of current in the diametrically-opposite coil of the loop. All this will be better understood by reference to the accompanying drawing, which shows a diagram of one series of coils of a ring-armature with connection to a commutator and with each other.

In said drawing, 1 1' 2 2' 3 3' represent pairs of diametrically-opposite coils upon a ring armature-core, and $a\ a'$, $b\ b'$, and $c\ c'$ are conductors whereby said pairs are connected in permanent continuous loops, which are never broken. I have shown six coils, constituting three sets or pairs of opposed coils, each pair being in one loop; but it is quite clear that a much greater number of pairs, and also that less than three pairs, may be used. The conductors $a\ b\ c$ are electrically connected by the three branches $d\ e\ f$ of a spider, and the conductors $a'\ b'\ c'$ are tapped, respectively at $g\ g'\ g^2$ by wires $A'\ A^2\ A^3$, which in turn connect with the conducting-plates 1", 2", and 3" of the commutator M. There being three pairs of coils upon the armature-core, the commutator has three conducting-segments, each extending over an arc of a little less than one hundred and twenty degrees; but it is clear that when the number of pairs of coils is varied the commutator will be varied accordingly, as is well understood by those skilled in the art, and it is also clear that a great number of pairs of coils may be connected to a series of commutators and to the line. Brushes B B' bear upon the commutator at diametrically-opposite points, as usual, and, as shown in the drawing, double brushes are used, one prong of each being in advance of the other prong. The field-of-force magnet or magnets are so disposed as to produce the neutral line or space somewhere in the vicinity or about the line $o\ o$. The field-magnets, however, are not shown in the drawing, for the sake of clearness of illustration. The direction of rotation of the armature and its connected commutator is indicated by arrows, as is also the course of the current through the machine from beginning to end.

In the position which the coils occupy during the phase of operation represented in the drawing, they are all under the influence of effective portions of the field, and the loops in which the pairs of coils are placed being tapped, as above described, there will be a current through all of them and to line. For convenience of description, we will trace the course of the current from brush B to brush B'. Entering at B, the current takes the course through commutator-segment 1'' and wire A' to $g$, where it divides on conductor $a'$, and passes through coils 1 1', uniting at arm $d$ of the spider, and again dividing at junction of this arm with the arms $e\ f$. At the termini of these arms each branch divides again upon the conductors $b$ and $c$, respectively, the portion dividing upon $b$ passing in two branches through coils 2 2', and, uniting again at $g'$, goes by wire $A^2$ to commutator-segment 2'', and the portion which divides upon $c$ passing in two branches through coils 3 3', and, uniting again at $g^2$, goes by wire $A^3$ to commutator-segment 3''. From segments 2'' and 3'' the current unites upon brush B', each of the two prongs of the brush being at this stage in contact with one of these segments, and passes from there to line. It is hardly necessary to state that the field-magnets are fed either by a branch from the line or that the same may be directly included in the line, as is usual in dynamo-electric generators. It will thus be seen that at the phase of operation so far described there is an effective current to line from all coils. As the armature continues to rotate in the direction of the arrows marked R and $r$ at the armature and commutator, respectively, coils 3 3' approach the neutral line $o\ o$, and when quite close to said line the branch of brush B', which in the drawing is shown in contact with commutator-segment 3'', passes upon the insulation between 2'' and 3''. Immediately before actual break of brush B' with 3'' the coils 3 3' furnish little current; but as soon as the break actually takes place there is not only no current to line from said coils, but there is no perceptible trace of current in the loop formed by said coils, since the generating tendency of one coil is neutralized by the generating tendency of the other coil. This will be the case even when the brushes are so adjusted as to break contact with loop 3 3', while the latter is still within an effective portion of the field, and it is, in fact, desirable to so adjust them, whereby the undulations of the current going to line may be reduced to a minimum. The current now passes through the machine as before, except that no division occurs at the point where the branches $d\ e\ f$ of the spider unite, the current passing directly from $d$ to $f$ through coils 2 2' to commutator-segment 2'', loop 3 3' being cut out.

I claim as my invention—

1. In a dynamo-electric machine, an armature consisting of a series of diametrically-opposite coils connected in independent loops, substantially as described.

2. In a dynamo-electric machine, an armature having diametrically-opposite coils connected in independent loops and each of said loops having a direct connection to the commutator, substantially as described.

3. In a dynamo-electric machine, a rotating armature provided with pairs of generating-coils connected in independent loops and located in diametrically-opposite parts of the field, in combination with a commutator and connections between said commutator and the loops and between the loops, substantially as described.

4. In a dynamo-electric generator, an armature provided with pairs of generating-coils connected in loops, the coils of each pair being located in diametrically-opposite parts of the field, in combination with a commutator and direct connections from the same to each loop, whereby the generating effects of the coils within the loops are mutually neutralized when the loops are disconnected from the external circuit, substantially as described.

5. In a dynamo-electric generator, an armature provided with pairs of diametrically-opposite coils connected in independent loops, whereby the generation of current in the loops is neutralized when the same are disconnected from the external circuit, substantially as described.

6. In a dynamo-electric generator, an armature provided with pairs of mutually-neutralizing coils connected in independent loops, in combination with a commutator system having a conducting-segment for each loop, and circuit-connections whereby each loop is cut out while it passes the neutral line of the field of force, substantially as described.

7. In a dynamo-electric machine, an armature the coils on which are connected in sets of twos, both terminals of each coil connected permanently to both terminals of its opposite coil, the terminals of like polarity being connected together, substantially as shown and described.

In testimony whereof I have signed my name to this specification in the presence of two subscribing witnesses.

FORÉE BAIN.

Witnesses:
 JAS. CRAIG,
 B. G. COWAN.